(12) United States Patent
Matsui

(10) Patent No.: US 11,961,375 B2
(45) Date of Patent: Apr. 16, 2024

(54) COMMODITY MANAGEMENT SYSTEM WITH A CART HAVING A WIRELESS TAG READER/WRITER FOR SPECIFYING A QUANTITY OF A COMMODITY DISPLAYED IN A DISPLAY AREA

(71) Applicant: TOSHIBA TEC KABUSHIKI KAISHA, Tokyo (JP)

(72) Inventor: Yoshiyuki Matsui, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 148 days.

(21) Appl. No.: 17/371,044

(22) Filed: Jul. 8, 2021

(65) Prior Publication Data
US 2022/0092949 A1  Mar. 24, 2022

(30) Foreign Application Priority Data
Sep. 18, 2020  (JP) ................... 2020-157046

(51) Int. Cl.
| | |
|---|---|
| *G07G 1/00* | (2006.01) |
| *B62B 3/14* | (2006.01) |
| *B62B 5/00* | (2006.01) |
| *G06Q 10/087* | (2023.01) |
| *G06Q 20/20* | (2012.01) |
| *G07G 1/01* | (2006.01) |

(52) U.S. Cl.
CPC ......... *G07G 1/0054* (2013.01); *B62B 3/1424* (2013.01); *B62B 5/0096* (2013.01); *G06Q 10/087* (2013.01); *G06Q 20/203* (2013.01); *G07G 1/009* (2013.01); *G07G 1/01* (2013.01)

(58) Field of Classification Search
CPC .. G06Q 20/203; G06Q 10/087; G07G 1/0045; G07G 1/0054; G07G 1/0081; G07G 1/009; B62B 3/1424; B62B 5/0096
USPC ........... 235/383, 385; 705/28; 340/5.9, 5.91, 340/5.92, 572.1, 10.1, 539.32
See application file for complete search history.

(56) References Cited

U.S. PATENT DOCUMENTS

| | | | | |
|---|---|---|---|---|
| 2005/0218217 A1* | 10/2005 | Hasegawa | ............... | G06Q 30/06 235/383 |
| 2006/0125604 A1* | 6/2006 | Vaiana | ................... | G06Q 30/00 340/5.91 |
| 2008/0106377 A1* | 5/2008 | Flores | .................. | G06Q 10/087 340/5.92 |
| 2009/0231135 A1* | 9/2009 | Chaves | ................ | G06Q 10/087 340/572.1 |

(Continued)

FOREIGN PATENT DOCUMENTS

JP  2006-111411 A  4/2006

Primary Examiner — Suezu Ellis
(74) Attorney, Agent, or Firm — Kim & Stewart LLP

(57) ABSTRACT

A commodity management system includes a cart including a wireless tag reader/writer configured to read first information from first wireless tags attached to commodities displayed in a store and second information from second wireless tags each disposed in a different display area in the store, and a commodity management apparatus configured to acquire the first and second information read by the wireless tag reader/writer, determine a display area in the store using the acquired second information, and specify a quantity of a commodity displayed in the determined display area based on the acquired first information.

10 Claims, 9 Drawing Sheets

(56) References Cited

U.S. PATENT DOCUMENTS

| | | | |
|---|---|---|---|
| 2016/0055562 A1* | 2/2016 | Kim | H04W 4/80 705/26.61 |
| 2021/0225134 A1* | 7/2021 | Mori | G06K 19/0723 |

* cited by examiner

FIG. 4

| TAG ID SET | DISPLAY STAND NO. | COMMODITY CODE | COMMODITY NAME |
|---|---|---|---|
| 001,002 | 1 | ×××1 | ○○ |
| 002,003 | 2 | ×××2 | □□ |
| 003,004 | 3 | ×××3 | △△ |
| ... | ... | ... | ... |

| COMMODITY CODE | INDIVIDUAL ITEM CODE |
|---|---|
| ×××1 | ○○○1 |
|  | ○○○2 |
|  | ○○○3 |
| ... | ... |
| ×××2 | □□□1 |
|  | □□□2 |
|  | □□□3 |
| ... | ... |
| ... | ... |

| COMMODITY CODE | SET VALUE |
|---|---|
| ×××1 | 50 |
| ×××2 | 20 |
| ×××3 | 30 |
| ... | ... |

514

COMMODITY MANAGEMENT SYSTEM WITH A CART HAVING A WIRELESS TAG READER/WRITER FOR SPECIFYING A QUANTITY OF A COMMODITY DISPLAYED IN A DISPLAY AREA

CROSS-REFERENCE TO RELATED APPLICATION

This application is based upon and claims the benefit of priority from Japanese Patent Application No. 2020-157046, filed Sep. 18, 2020, the entire contents of which are incorporated herein by reference.

FIELD

Embodiments described herein relate generally to a commodity management system, a commodity management apparatus, and a commodity management method.

BACKGROUND

Recently, in retail shops such as supermarkets, tasks performed by individual store clerks have increased in number and become more varied due to labor shortages, and thus the store clerks are busier. Therefore, a clerk may not be aware that the stock of the products displayed on shelves or the like at the store has reached a low level (hereinafter referred to as "low stock state"), which may result in loss of sales opportunities. Thus, it is desired to appropriately track and manage the products displayed in the store.

There is a management system for managing stock levels for items such as books on a shelf using a radio frequency identification (RFID) technique. This management system manages the stock of items by reading tag information with an RFID reader from an RF tag or a wireless tag attached to the shelf or the items.

An attempt to apply such a management system to commodity management in a retail shop so that a clerk becomes aware of a low stock of commodities displayed in the store has been previously made. However, in order to detect the low stock of displayed commodities, the clerk needs to have an RFID reader read tag information from wireless tags attached to each of the commodities. Since the store clerk tends to be busy, he or she may forget to do the necessary management work with the RFID reader for tracking each displayed item, and sales opportunities of the commodities may still be lost.

BRIEF DESCRIPTION OF THE DRAWINGS

FIG. 4 is a diagram illustrating a commodity area table.

FIG. 5 is a diagram illustrating an individual item information table.

FIG. 6 is a diagram illustrating a set value table.

DETAILED DESCRIPTION

One or more embodiments provide a commodity management system and apparatus capable of detecting a low stock state of displayed retail commodities without additional store clerk effort.

According to one embodiment, a commodity management system includes a cart with a wireless tag reader/writer configured to read first information from first wireless tags attached to commodities displayed in display area in a store and second information from second wireless tags associated with different display areas in the store. A commodity management apparatus of the system is configured to acquire the first and second information read by the wireless tag reader/writer, determine a display area in the store using a tag ID in the acquired second information, and specify the quantity of a commodity displayed in the determined display area based on tag IDs in the acquired first information.

Hereinafter, a commodity management system and a commodity management apparatus according to one or more example embodiments will be described with reference to the drawings.

Figure 1:
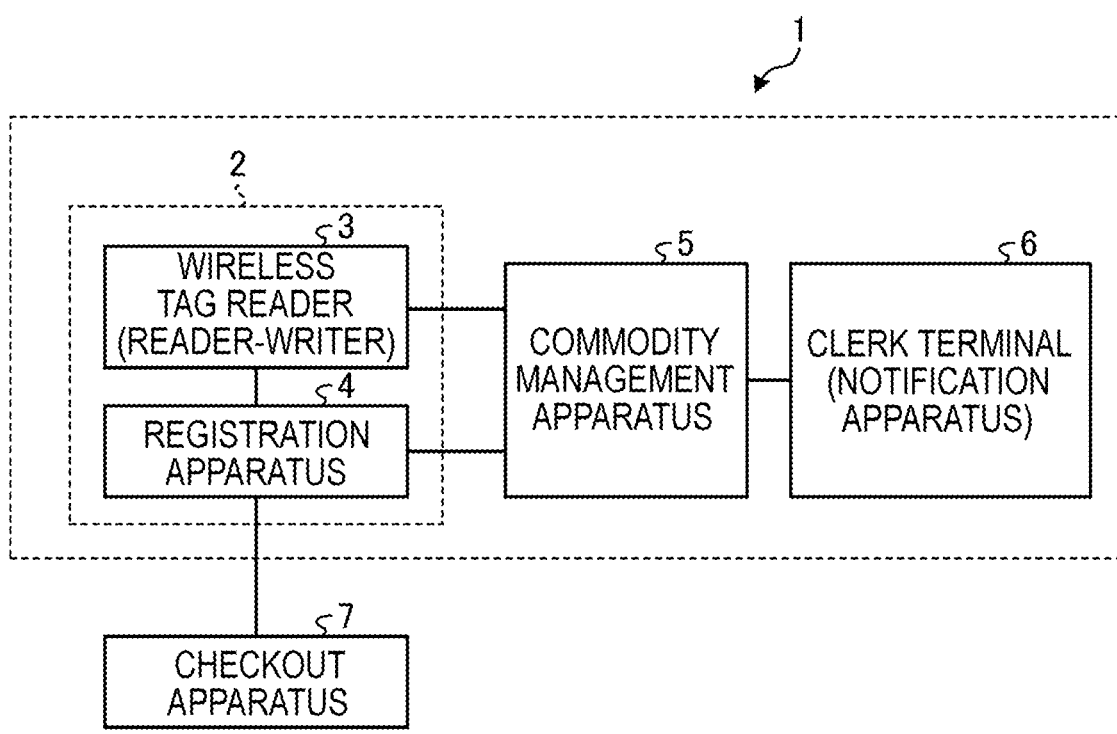
FIG. 1 is a block diagram illustrating a commodity management system according to an embodiment.

FIG. 1 is a block diagram illustrating a commodity management system 1. The commodity management system 1 includes a shopping cart 2 (also referred to as a cart 2 for simplicity), a wireless tag reader 3, a registration apparatus 4, a commodity management apparatus 5, and a clerk terminal 6.

The wireless tag reader 3 is attached to the cart 2. The wireless tag reader 3 is connected to the registration apparatus 4 and the commodity management apparatus 5 via a wireless local area network (LAN) or the like such that information can be transmitted and received to and from the registration apparatus 4 and the commodity management apparatus 5.

The registration apparatus 4 is attached to the cart 2. The registration apparatus 4 is connected to the wireless tag reader 3 and the commodity management apparatus 5 via a wireless local area network (LAN) or the like such that information can be transmitted and received to and from the wireless tag reader 3 and the commodity management apparatus 5. In addition, the registration apparatus 4 is connected to a checkout apparatus 7 provided in a registration counter of a shop via a wireless LAN or the like such that information can be transmitted and received to and from the checkout apparatus 7. A customer registers a commodity to be purchased using the registration apparatus 4 attached to the cart 2 during shopping. When the shopping is done, the customer proceeds to the registration counter to perform checkout processing using the checkout apparatus 7.

The commodity management apparatus 5 is a computer provided in, for example, a back office of the shop. As described above, the commodity management apparatus 5 is connected to the wireless tag reader 3 and the registration apparatus 4 and is connected to the clerk terminal 6 carried by each clerk via a wireless LAN or the like such that information can be transmitted and received to and from the clerk terminal 6.

Figure 2:
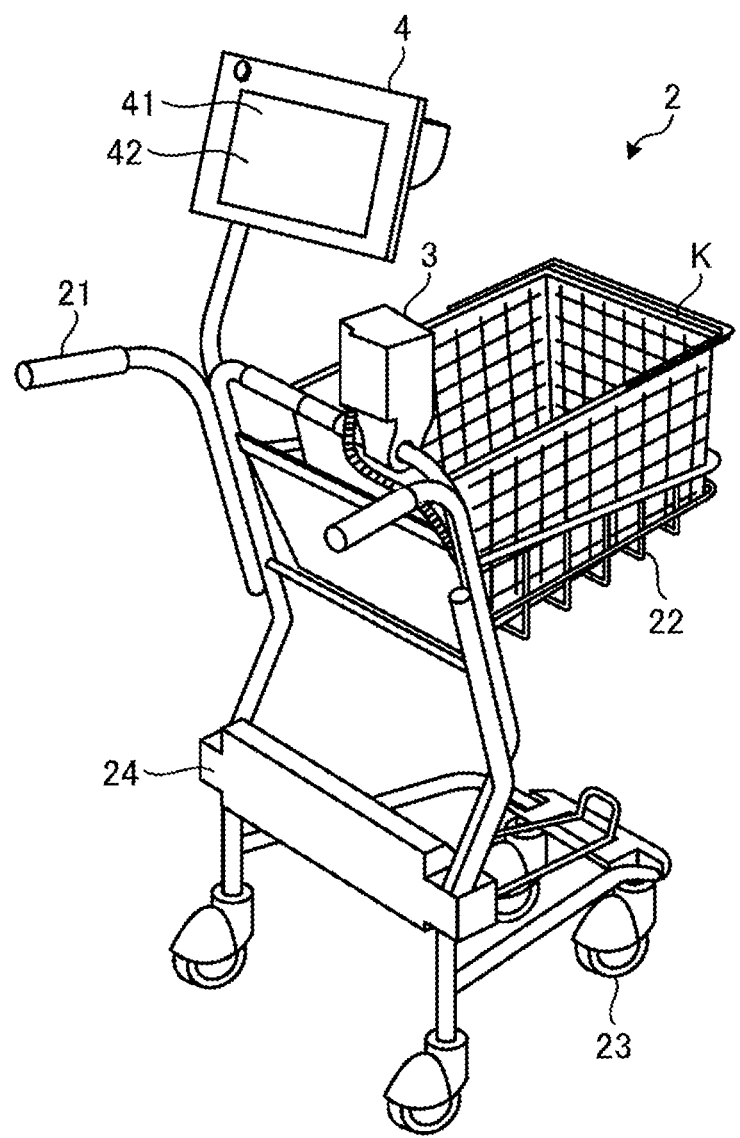
FIG. 2 is a perspective view illustrating the external appearance of a shopping cart.

FIG. 2 is a diagram illustrating the external appearance of the cart 2 where the wireless tag reader 3 and the registration apparatus 4 are provided. The cart 2 is used in a shop such as a supermarket for storing a commodity to be purchased by the customer directly or through a basket K while being moved by the customer. The cart 2 has a body with wheels so as to be movable in the shop. The wireless tag reader 3 and the registration apparatus 4 may be provided in the basket K. The cart 2 includes, for example, handles 21, a basket placing unit 22, casters 23, and a battery holder 24.

A pair of handles 21 are provided to protrude to a side of the cart 2 where the customer is positioned, that is, a side opposite to the basket placing unit 22. Hereinafter, the basket placing unit 22 side will be referred to as "front side" and the side to which the handles 21 protrude will be referred to as "rear side". In addition, a direction along the horizontal surface and perpendicular to the front-rear direction of the cart 2 will be referred to as "left-right direction". The handles 21 are held by the customer to move the cart 2. The basket placing unit 22 is a table on which the basket K that stores a commodity to be purchased by the customer is detachably placed.

Four casters 23 are provided in the cart 2. The casters 23 can rotate independently such that the cart 2 can be pushed by the customer to freely move in any direction among the front, rear, left, and right directions in the shop. The battery holder 24 is provided in a rear portion of the cart 2 and holds a battery such that the battery is detachable from the battery holder 24. The battery supplies power to the wireless tag reader 3.

The wireless tag reader 3 includes antennas on both the left side surface and the right side surface. The wireless tag reader 3 can transmit radio waves from the antennas. The wireless tag reader 3 reads tag information from a wireless tag by transmitting carrier waves from the antennas and then receiving response waves from the wireless tag. The wireless tag reader 3 can change the intensity (signal output strength) of the radio waves transmitted from the antennas. By setting the wireless tag reader 3 to a first intensity that is a strong intensity, tag information can be read from wireless tags on a commodity display section or the like beyond the cart 2. Wireless tags fixed to a commodity display section, shelf, or the like are referred to in the following as area wireless tags and wireless tags attached to commodities such as those displayed in or on the display section are referred to as item wireless tags. When the wireless tag reader 3 on cart 2 is set to the first strength, area wireless tags and item wireless tags can be read while the cart 2 is being moved around the store. By setting the wireless tag reader 3 to a second intensity that is weaker than the first intensity and the tag reading range can be limited to be the inside of the basket K, thus tag information can be read only from item wireless tags attached to commodities stored in the basket K. Each of the area wireless tags stores display section information corresponding to a predetermined area or region of a commodity display section. Each of the item wireless tags stores a commodity code specifying a commodity type and individual item information specifying the individual item to which the item wireless tag is affixed.

The registration apparatus 4 is, for example, a tablet terminal and is detachably attached to the cart 2. The registration apparatus 4 includes a display 41 and a touch panel 42. The registration apparatus 4 completes sales transaction of the commodity to be purchased by the customer (hereinafter also referred to as "commodity registration"). The commodity registration includes a process of storing commodity information (for example, a commodity name or a price) of a commodity specified based on a commodity code that is acquired by the wireless tag reader 3 or a code reader provided separately. Information such as a commodity name can be considered a commodity code. Hereinafter, a commodity code, a commodity name, a price, and the like will also be collectively referred to as "commodity information".

The display 41 includes, for example, a liquid crystal panel and displays various information. The touch panel 42 is provided on a surface of the display 41, inputs information corresponding to a touched position to a control unit of the registration apparatus 4, and functions as an operation input unit configured to accept an operation by a user. The details of the registration apparatus 4 will be described below.

Figure 3:
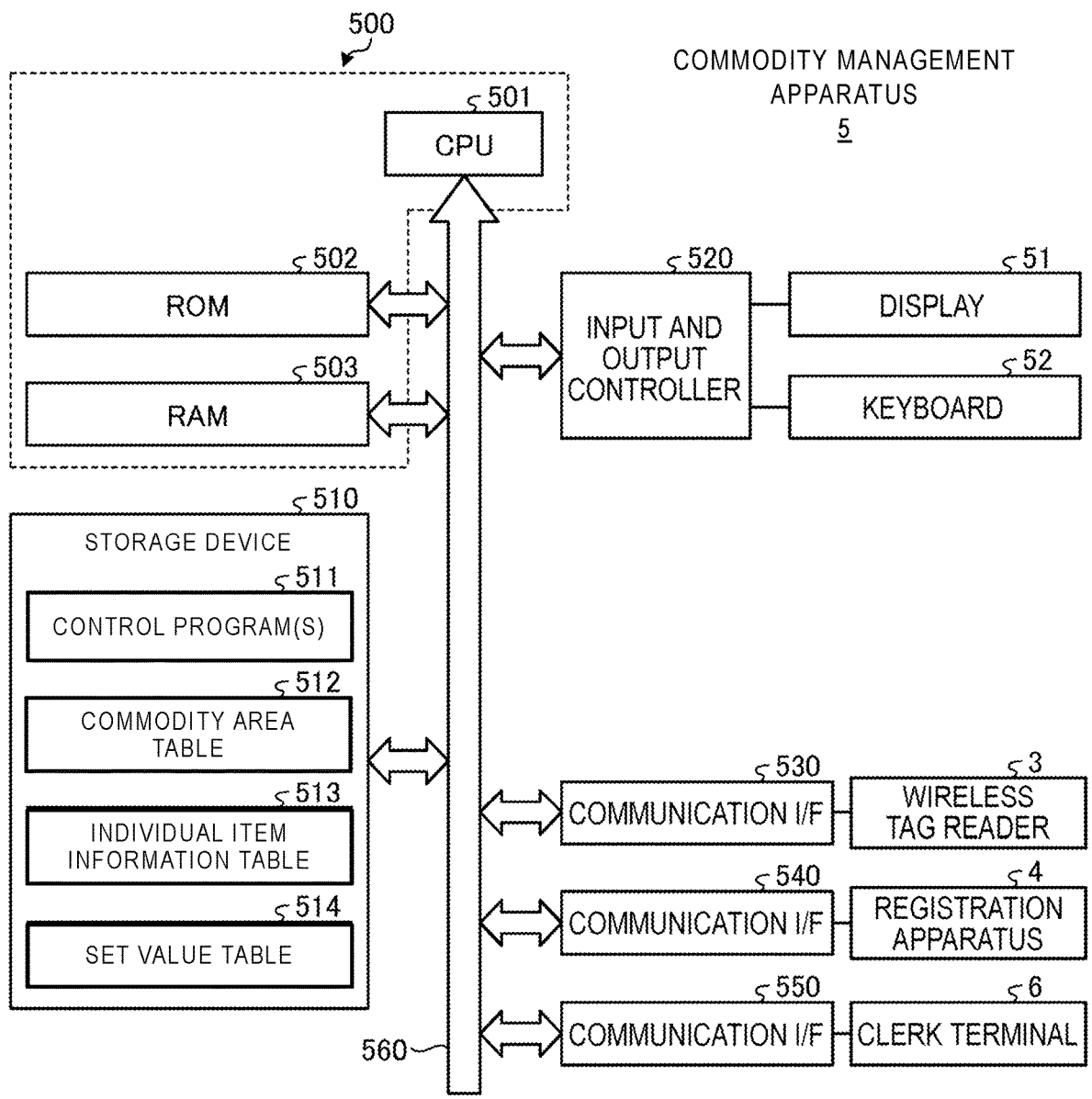
FIG. 3 is a hardware block diagram of a commodity management apparatus.

Next, the commodity management apparatus 5 will be described below in detail. FIG. 3 is a hardware block diagram of the commodity management apparatus 5. For example, the commodity management apparatus 5 includes a control unit 500, a storage device 510, an input and output controller 520, and communication I/Fs (interfaces) 530 to 550. The control unit 500, the storage device 510, the input and output controller 520, and the communication I/Fs (interfaces) 530 to 550 are connected to each other via a bus 560.

The control unit 500 includes a Central Processing Unit (CPU) 501, a Read Only Memory (ROM) 502, and a Random Access Memory (RAM) 503. The CPU 501, the ROM 502, and the RAM 503 are connected to each other via the bus 560.

The CPU 501 controls an overall operation of the commodity management apparatus 5. The ROM 502 stores various programs executed by the CPU 501 and/or various data. The RAM 503 is used as a work area for the CPU 501, and temporarily stores various programs and/or various data loaded from the ROM 502 or the storage device 510. The control unit 500 executes various control processes of the commodity management apparatus 5 by the CPU 501 operating in accordance with a control program(s) that is stored in the ROM 502 or the storage device 510 and is loaded to the RAM 503.

For example, the storage device 510 is a rewritable non-volatile storage medium such as a hard disk drive (HDD), a solid state memory (SSD), or a flash memory. The storage device 510 stores a control program(s) 511, a commodity area table 512, an individual item information table 513, and a set value table 514.

FIG. 4 is a diagram illustrating the commodity area table 512. In the commodity area table 512, a tag ID set, a display stand No., a commodity code, and a commodity name are correlated with each other.

The tag ID set represents a pair of tag IDs of area wireless tags arranged in the commodity display section. For example, the tag ID set is a combination of tag IDs stored in the area wireless tags provided in commodity display areas or display stands adjacent to each other.

The display stand No. represents the number of the display stand specified by the tag ID set. The display stand is a table where a commodity is displayed. The display stand No. specifies is a predetermined area of the commodity display section associated with the tag ID set.

The commodity code specifies a commodity displayed on the corresponding display stand. The example of FIG. 4 represents that a commodity specified by the commodity code "XXX1" is displayed on the display stand having the display stand No. "1".

The commodity name represents the name of the commodity displayed on the corresponding display stand. The example of FIG. 4 represents that the commodity having the commodity name "OO" is displayed on the display stand having the display stand No. "1".

FIG. 5 is a diagram illustrating the individual item information table 513. In the individual item information table 513, a commodity code and individual item codes are correlated with each other.

As described above, the commodity code specifies a commodity. The individual item code is a unique code set for each individual commodity. In the individual item information table 513, a commodity code and individual item codes are correlated with each other for all the commodities stocked in the shop, and are updated as necessary.

FIG. 6 is a diagram illustrating the set value table 514. In the set value table 514, a commodity code and a set value are correlated with each other.

As described above, the commodity code specifies a commodity. The set value represents the quantity of the commodity that need to be restocked on the display stand. The example of FIG. 6 represents that the commodity having the commodity code "XXX1" needs to be restocked if the commodity is sold and the quantity of the commodity displayed on the display stand decreases to 50. The set value is set per commodity code and can be appropriately set according to the condition of the shop such as the size of the display stand or the commodity. For example, the set value can be set to half of the quantity of the commodity displayed on each of the display stands when the shop is opened.

Referring back to FIG. 3, the input and output controller 520 is connected to a display 51 and a keyboard 52. The input and output controller 520 has a function as an input and output interface for hardware to be connected and a function for controlling the hardware. As a result, the control unit 500 can transmit and receive information to and from the display 51 and the keyboard 52 via the input and output controller 520, and the hardware can be controlled based on an instruction issued by the control unit 500.

The display 51 displays various information such as information input to the keyboard 52 or information received from the wireless tag reader 3 or the registration apparatus 4. The keyboard 52 is used for the user to input information, for example, the set value stored in the set value table 514.

The communication I/F 530 is an interface for communication with the wireless tag reader 3. The communication I/F 540 is an interface for communication with the registration apparatus 4. The communication I/F 550 is an interface for communication with the clerk terminal 6 carried by the clerk. FIG. 3 illustrates only one clerk terminal 6. However, the communication I/F 550 can also be connected to a plurality of clerk terminals 6. The control unit 500 is connected to the wireless tag reader 3, the registration apparatus 4, and the clerk terminal 6 via the communication I/Fs 530 to 550 such that information can be transmitted and received to and from the respective apparatuses.

Figure 7:
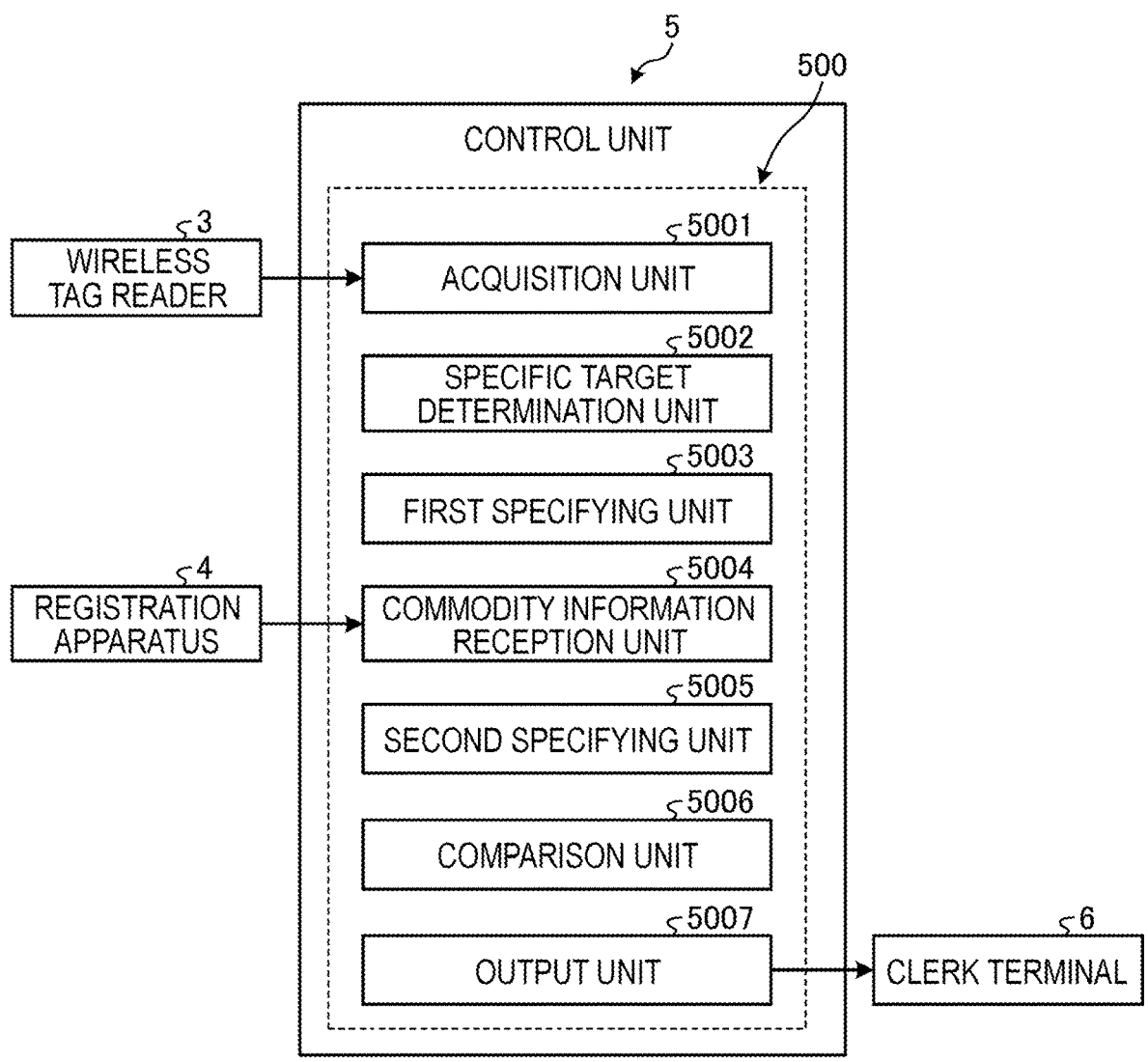
FIG. 7 is a block diagram depicting certain functional aspects of a commodity management apparatus.

Next, a functional configuration of the control unit 500 in the commodity management apparatus 5 will be described. FIG. 7 is a functional block diagram of the control unit 500 in the commodity management apparatus 5. By the CPU 501 operating in accordance with the control program stored in the ROM 502 or the storage device 510, the control unit 500 performs functions of an acquisition unit 5001, a specific target determination unit 5002, a first specifying unit 5003, a commodity information reception unit 5004, a second specifying unit 5005, a comparison unit 5006, and an output unit 5007. The respective functional units may be implemented by one or more circuits. In addition, the respective functional units may be implemented by a plurality of computers. For example, the wireless tag reader 3 or the registration apparatus 4 may perform a part of the functions.

The acquisition unit 5001 is configured to acquire display section information and individual item information. The display section information represents a predetermined area of the commodity display section where a commodity is displayed, and the individual item information specifies an individual item displayed on the commodity display section. Specifically, the acquisition unit 5001 acquires an area tag ID and an individual item code from the wireless tag reader 3, for example, every 30 seconds. The area tag ID is read by the wireless tag reader 3 from the area wireless tag arranged on the display stand. The acquisition unit 5001 acquires a combination of area tag IDs (a tag ID set), which are stored in the commodity area table 512, and acquires display section information representing the predetermined area of the commodity display section where the commodity is displayed. The individual item code is read by the wireless tag reader 3 from the item wireless tag that is attached to the commodity displayed on the display stand or in the basket K. In addition, the acquisition unit 5001 acquires the commodity code together with the individual item code from the wireless tag reader 3.

In an embodiment, the item wireless tag stores the commodity code and the individual item code, which can be read by the wireless tag reader 3. Accordingly, the wireless tag reader 3 also functions as a code reader that reads the commodity code specifying a commodity. The code reader may be a barcode reader that reads the commodity code from a barcode attached to the commodity.

If the acquisition unit 5001 acquires area tag IDs, the specific target determination unit 5002 refers to the commodity area table 512. If the acquired area tag IDs are the ones indicated in the tag ID set field, the display stand No. and the commodity code corresponding thereto are determined as a count target of the commodity. For example, if the area tag IDs acquired by the acquisition unit 5001 are "001" and "002", the specific target determination unit 5002 determines to count the quantity of the commodity having the commodity code "XXX1" displayed on the display stand No. 1.

The first specifying unit 5003 is configured to specify a quantity of a commodity displayed in a predetermined area of the commodity display section based on the individual item information and the display section information read by the wireless tag reader 3. Specifically, the first specifying unit 5003 is configured to specify a commodity code corresponding to the display section information (i.e., the display stand No.) acquired by the acquisition unit 5001 from the commodity area table 512. The first specifying unit 5003 is further configured to refer to the individual item information table 513 and count a number of individual item codes corresponding to the commodity code acquired by the acquisition unit 5001, which indicates a quantity of the commodity displayed in the predetermined area specified by the display section information.

More specifically, the first specifying unit 5003 counts the number of individual item codes corresponding to the commodity code as a calculation target determined by the specific target determination unit 5002 among the individual item codes acquired by the acquisition unit 5001 so as to count the quantity of the target commodity on the predetermined display stand. For example, if the specific target determination unit 5002 determines to count the quantity of the commodity having the commodity code "XXX1" displayed on the display stand No. 1, the first specifying unit 5003 refers to the individual item information table 513. The first specifying unit 5003 then counts the number of individual item codes corresponding to the commodity code "XXX1" among the individual item codes acquired by the acquisition unit 5001, and specifies this number as the quantity of the commodity displayed on the display stand No. "1".

The commodity information reception unit 5004 acquires information representing the commodity code of the commodity that has been registered and the quantity thereof from the registration apparatus 4. The information representing the quantity of the commodity may be the individual item codes registered in the registration apparatus 4 or may be information representing the quantity of the registered commodity itself.

If the commodity codes that have been read by the wireless tag reader 3 from the wireless tags for commodity together with the individual item information include one or more commodity codes that have been registered by the registration apparatus 4, the second specifying unit 5005 specifies the quantity of the commodity displayed in the predetermined area by subtracting a quantity of the commodity registered by the registration apparatus 4 from a quantity of the commodity in the predetermined area read by the wireless tag reader 3. The second specifying unit 5005 optionally corrects the quantity specified by the first specifying unit 5003. Specifically, if the quantity of the commodity specified by the first specifying unit 5003 includes the quantity of the commodity stored in the basket K of the customer, the quantity of the commodity on the predetermined display stand is specified by subtracting the quantity of the commodity stored in the basket K from the quantity of the commodity specified by the first specifying unit 5003.

The second specifying unit 5005 specifies the quantity of the commodity by subtracting the quantity of the commodity having the commodity code acquired by the commodity information reception unit 5004 from the quantity specified by the first specifying unit 5003. That is, the second specifying unit 5005 is configured to specify a quantity of a commodity displayed in a predetermined area of the commodity display section. In order to more accurately specify the quantity of the commodity remaining in the display stand, the commodity management apparatus 5 includes the second specifying unit 5005 but does not need to include the second specifying unit 5005. For example, if the quantity of the commodity displayed on the display stand is large, the quantity of the commodity stored in the basket K by the customer has little effect on the determination of the low stock state of the commodity. In such a case, the commodity management apparatus 5 does not need to include the second specifying unit 5005.

The comparison unit 5006 refers to the set value table 514 and compares the quantity of the commodity specified by the second specifying unit 5005 and the predetermined set value associated with the commodity. If the commodity management apparatus 5 does not include the second specifying unit 5005, the comparison unit 5006 compares the quantity of the commodity specified by the first specifying unit 5003 and the predetermined set value.

The output unit 5007 is configured to output, if the quantity of the commodity in the predetermined area specified by the first specifying unit 5003 or the second specifying unit 5005 is less than the predetermined set value, display section information representing the predetermined area and the commodity code of the commodity having the quantity less than the set value. Specifically, if the comparison result of the comparison unit 5006 indicates that the quantity of the commodity specified by the first specifying unit 5003 or the second specifying unit 5005 is less than the set value, the output unit 5007 outputs, for example, information representing the display stand No. and information representing the commodity (e.g., the commodity code or name) to the clerk terminal 6. As a result, the clerk who carries the clerk terminal 6 can become aware of the commodity to be restocked on the display stand.

Figure 8:
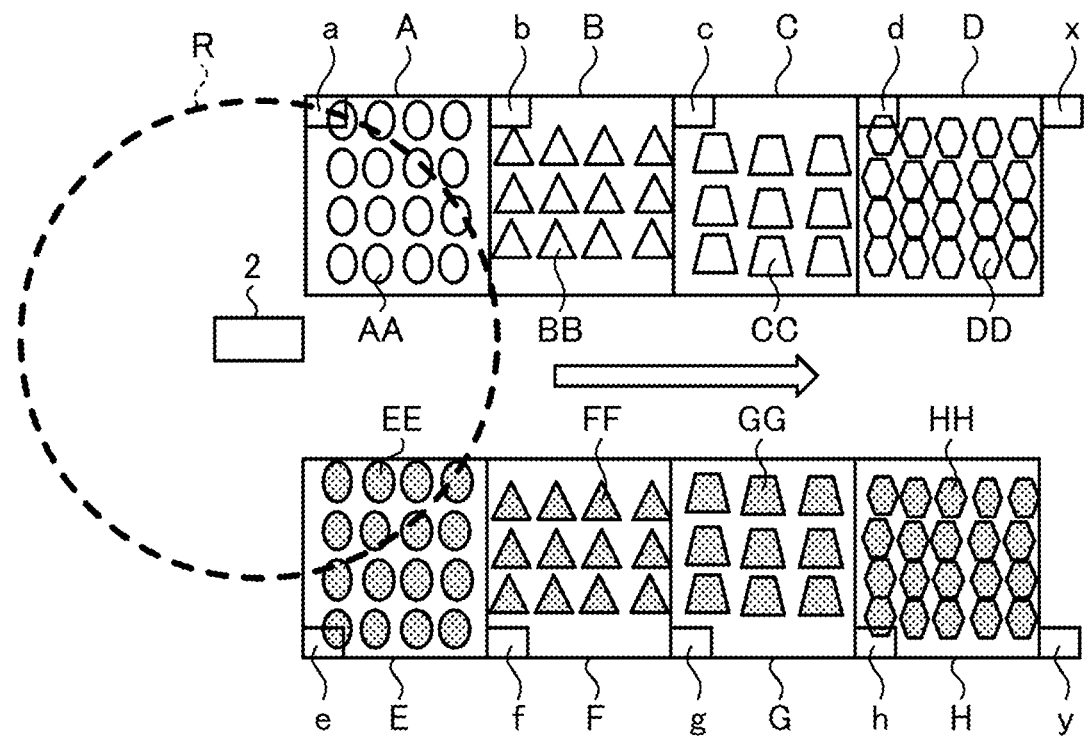
FIG. 8 is a diagram illustrating a method of specifying a quantity of a commodity displayed in a commodity display section.
Figure 9:
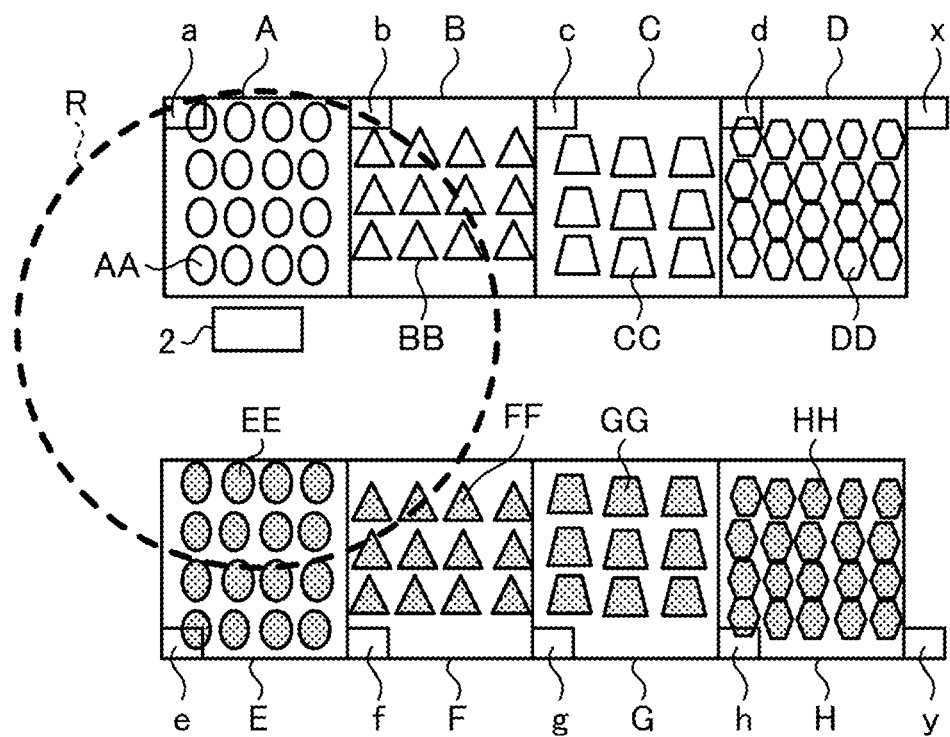
FIG. 9 is a diagram illustrating a method of specifying a quantity of a commodity displayed in the commodity display section.

Next, a method of specifying the quantity of the commodity displayed in the commodity display section will be described. FIGS. 8 and 9 are diagrams illustrating the method of specifying the quantity of the commodity displayed in the commodity display section by the commodity management apparatus 5.

In FIGS. 8 and 9, a commodity display section including a plurality of display stands A to H having the same size is provided on the sale counter. Here, each of the display stands A to H corresponds to a predetermined area of the commodity display section. On the display stands A to H, for example, area wireless tags "a" to "h" are provided at corners, respectively. Area wireless tags "x" and "y" are provided on the outsides of end portions of the display stands D and H, respectively. The area wireless tags "a" to "y" store unique area tag IDs of the respective tags in order of the arrangement. For example, the area wireless tag "a" stores a tag ID "001", the area wireless tag "b" stores a tag ID "002," . . . , the area wireless tag "x" stores a tag ID "005," . . . , respectively. Likewise, the area wireless tag "e" stores a tag ID "006", the area wireless tag "f" stores a tag ID "007," . . . , the area wireless tag "y" stores a tag ID "010," . . . , respectively. The area wireless tags "a," "b," "c," "d," and "x" are arranged at regular intervals. Likewise, the area wireless tags "e," "f," "g," "h," and "y" are arranged at regular intervals.

On the display stands A to H, commodities AA to HH are displayed, respectively. The sizes of the commodities AA to HH are different from each other. Therefore, the maximum quantities of the commodities that can be displayed on the respective display stands are different from each other. The drawings show a portion of each of the commodities for illustrations, and more items are displayed on each display stand. For example, the quantity of the commodity AA displayed on the display stand A is 100, the quantity of the commodity BB displayed on the display stand B is 40, and the quantity of the commodity CC displayed on the display stand C is 60. In addition, wireless tags for commodity (not illustrated) are attached to all the commodities. The item wireless tag stores a commodity code specifying a commodity and a unique individual item code set for each individual item.

In FIG. 8, the wireless tag reader 3 provided in the cart 2 emits radio waves with the first, strong field intensity. The reading range of the wireless tag reader 3 operating with the first field intensity is represented by R. As shown in FIG. 8, the wireless tag reader 3 reads tag information from the wireless tags located within the reading area R, that is, in this example, from the area wireless tag "a", a some of the item wireless tags attached to the commodities AA, and some of the item wireless tags attached to the commodities EE. The wireless tag reader 2 outputs the tag information that is read to the commodity management apparatus 5.

In the commodity management apparatus 5, the acquisition unit 5001 acquires the tag information. Here, the acquisition unit 5001 acquires only "001" as the area tag ID. The specific target determination unit 5002 refers to the tag ID set determined by the commodity area table 512. The specific target determination unit 5002 determines that the single tag ID "001" is not indicated in the tag ID set field, and then suspends the determination of a specific target area. Accordingly, any individual item code read from the item wireless tag in the state depicting in FIG. 8 is not used to specify the total quantity of a commodity, and the first specifying unit 5003 does not specify the quantity of the commodity.

After the cart 2 moves in an arrow direction (see FIG. 8) to the position indicated in FIG. 9, the wireless tag reader 3 reads tag information from the area wireless tag "a", the area wireless tag "b", all the item wireless tags attached to the commodities AA, some of the item wireless tags attached to the commodities BB, some of the item wireless tags attached to the commodities EE, and some of the item wireless tags attached to the commodities FF. The tag reader 3 outputs this read tag information to the commodity management apparatus 5.

In the commodity management apparatus 5, the acquisition unit 5001 acquires the tag information. Here, the acquisition unit 5001 acquires "001" and "002" as the area tag IDs. The specific target determination unit 5002 refers to the tag ID set field of the commodity area table 512. The specific target determination unit 5002 determines the display stand "1" corresponding to the combination of the tag IDs "001" and "002" as a specific target area and determines the commodity code "XXX1" as a specific target commodity.

Next, the first specifying unit 5003 refers to the individual item information table 513, extracts individual item codes corresponding to the commodity code "XXX1" among the individual item codes acquired by the acquisition unit 5001, and counts the number of the individual item codes. The first specifying unit 5003 specifies the calculated number of the individual item codes as the quantity of the commodity on the display stand "1".

It is assumed that, in the state depicted in FIG. 9, the customer stores the commodity AA in the basket K of the cart 2 for purchase, the field intensity of the wireless tag reader 3 is temporarily switched to the second field intensity, and the registration apparatus 4 executes the commodity registration. In such a case, in the commodity management apparatus 5, the commodity information reception unit 5004 acquires the commodity code and the individual item code of the registered commodity from the registration apparatus 4. For example, the commodity information reception unit 5004 acquires the commodity code "XXX1" and the individual item code "OOO1".

As a result, the second specifying unit 5005 verifies that the commodity code determined by the specific target determination unit 5002 and the commodity code acquired by the commodity information reception unit 5004 are "XXX1", and specifies the quantity of the commodity AA on the display stand "1" by subtracting the number of the individual item codes acquired by the commodity information reception unit 5004 from the quantity of the commodity calculated by the first specifying unit 5003. As a result, the quantity of the commodity on the display stand A can be more accurately specified by subtracting the quantity of the commodity moved from the display stand A to the basket K.

As described above, the commodity management apparatus 5 can specify the quantity of the commodity displayed on the specific display stand.

The method of specifying the quantity of the commodity displayed in the commodity display section by the commodity management apparatus 5 is not limited to the above-described method. The quantity of the commodity displayed in the commodity display section may be specified based on the individual item information that is read from the item wireless tags by the wireless tag reader 3 provided in the cart 2 and the display section information that is read from the area wireless tag. In addition, the wireless tag reader 3 does not need to be provided in all the carts 2 in the shop.

Figure 10:
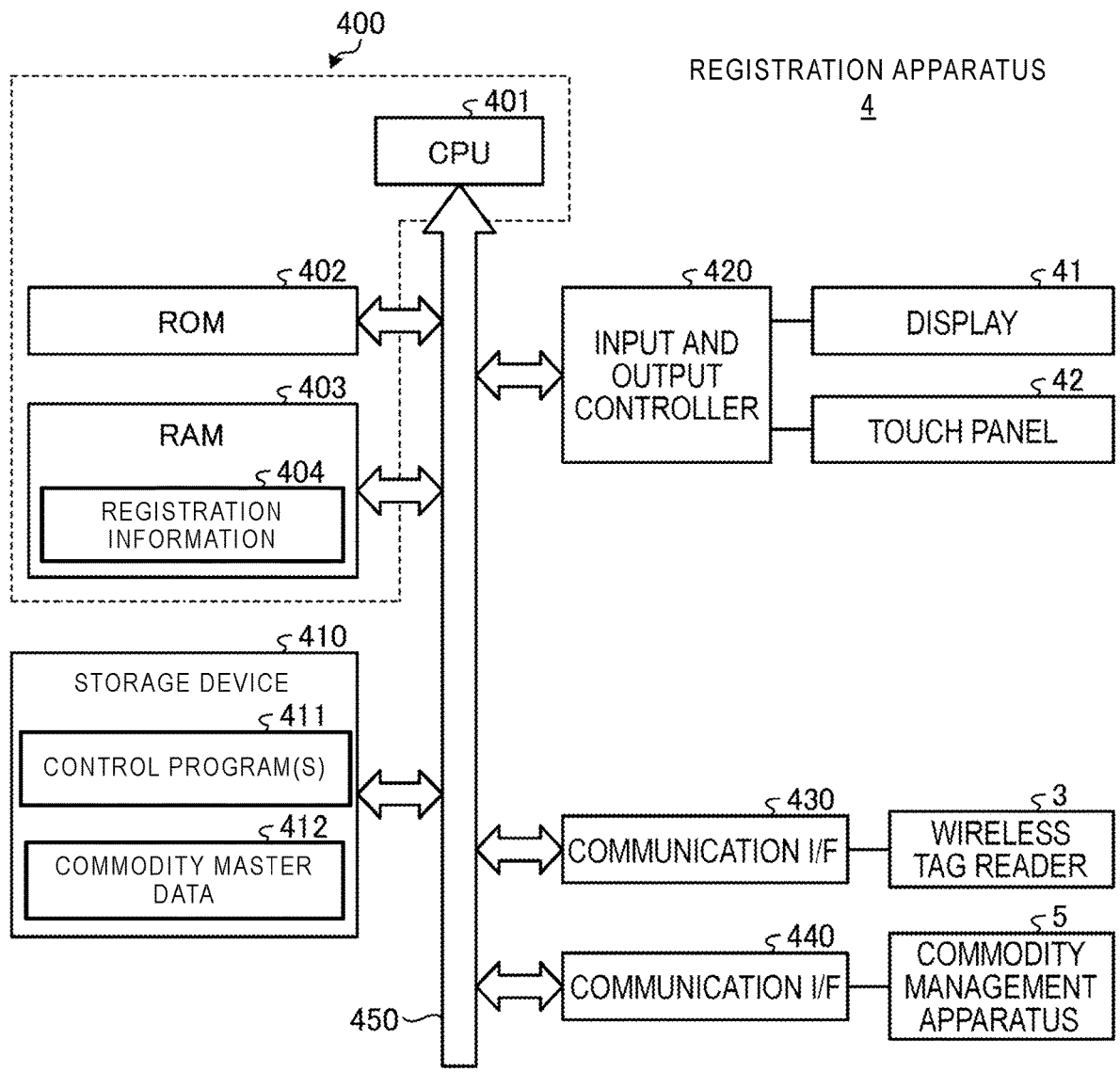
FIG. 10 is a hardware block diagram of a registration apparatus.

Next, the registration apparatus 4 will be described in more detail. FIG. 10 is a hardware block diagram of the registration apparatus 4. For example, the registration apparatus 4 includes a control unit 400, a storage device 410, an input and output controller 420, and communication I/Fs 430 and 440. The control unit 400, the storage device 410, the input and output controller 420, and the communication I/Fs (interfaces) 430 and 440 are connected to each other via a bus 450.

The control unit 400 includes a CPU 401, a ROM 402, and a RAM 403. The CPU 401, the ROM 402, and the RAM 403 are connected to each other via the bus 450.

The CPU 401 controls an overall operation of the registration apparatus 4. The ROM 402 stores various programs executed by the CPU 401 and/or various data. The RAM 403 includes a registration information 404. The registration information 404 represents one or more registered commodities and includes a commodity code, an individual item code, and the like received from the wireless tag reader 3 for each commodity. The registration information 404 further includes a commodity name, a price, or the like read from commodity master data 412 described below for each commodity code received from the wireless tag reader 3. In addition, the RAM 403 is used as a work area of the CPU 401, and temporarily stores various programs or various data copied from the ROM 402 and/or the storage device 410. The CPU 401 of the control unit 400 performs various control processes of the registration apparatus 4 by executing a control program(s) 411 stored in the ROM 402 and/or the storage device 410 and loaded onto the RAM 403.

For example, the storage device 410 is a rewritable non-volatile storage medium such as a hard disk drive (HDD), a solid state memory (SSD), or a flash memory. The storage device 410 stores the control program(s) 411 and the commodity master data 412.

The commodity master data 412 is a master file where a commodity code and commodity information (i.e., a commodity name, a price, and the like) are correlated with each other and are stored for the commodities displayed and sold in the shop. The commodities displayed and sold in the shop change daily, and thus the commodity master data 412 is appropriately updated.

The input and output controller 420 is connected to the display 41 and the touch panel 42. The input and output controller 420 has a function as an input and output interface for hardware to be connected and a function for controlling the hardware. As a result, the control unit 400 can transmit and receive information to and from the display 41 and the touch panel 42 via the input and output controller 420, and the hardware can be controlled based on an instruction from the control unit 400.

The communication I/F 430 is an interface for communication with the wireless tag reader 3. The communication I/F 440 is an interface for communication with the commodity management apparatus 5. As a result, the control unit 400 can transfer and receive information to and from the wireless tag reader 3 and the commodity management apparatus 5 via the communication I/Fs 430 and 440.

Figure 11:
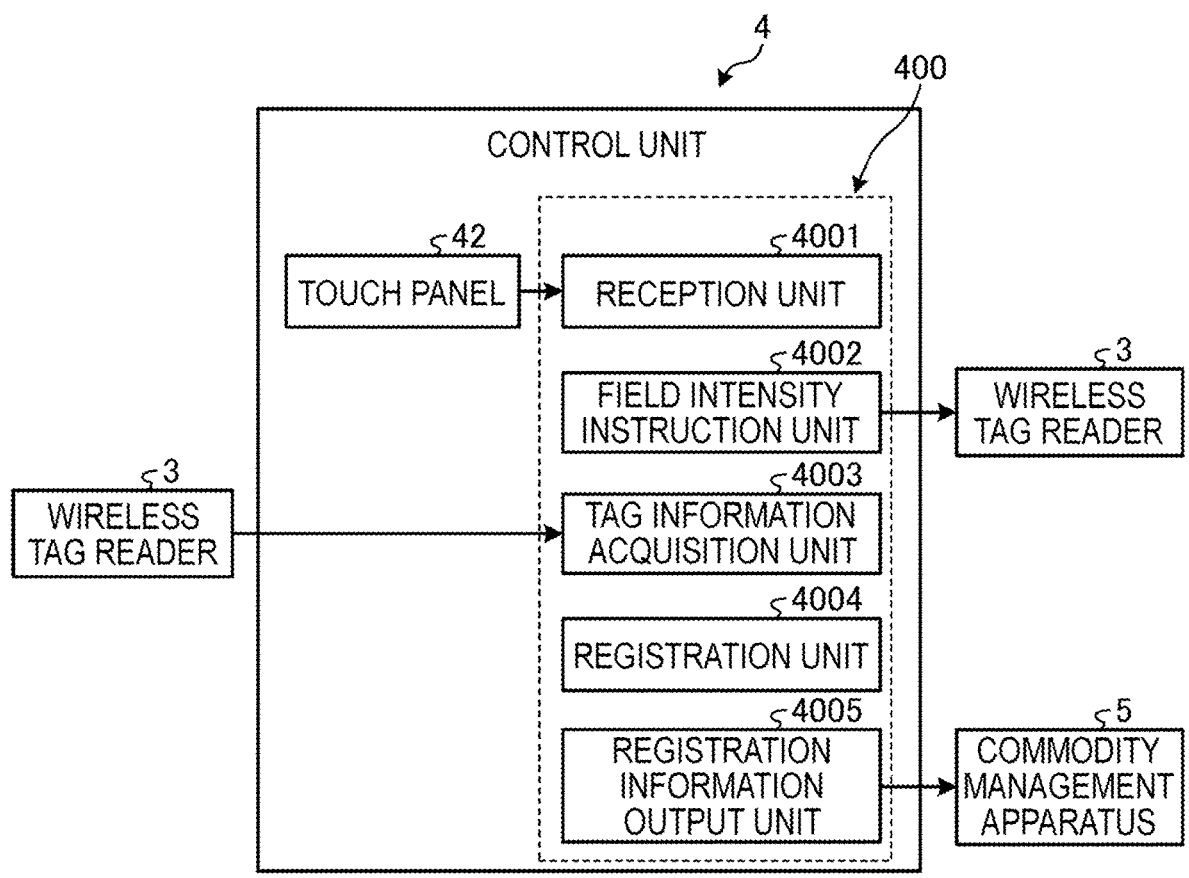
FIG. 11 is a block diagram depicting certain functional aspects of a registration apparatus.

Next, a functional configuration of the control unit 400 in the registration apparatus 4 will be described. FIG. 11 is a functional block diagram of the control unit 400 in the registration apparatus 4. The CPU 401 executes the control program(s) 411 to perform the functions of a reception unit 4001, a field intensity instruction unit 4002, a tag information acquisition unit 4003, a registration unit 4004, and a registration information output unit 4005. The respective functional units may be implemented by hardware circuits.

The reception unit 4001 acquires an instruction for commodity registration that is input via the touch panel 42. When a customer operates the touch panel 42 to register a commodity stored in the basket K of the cart 2, the reception unit 4001 acquires an instruction signal for commodity registration.

The field intensity instruction unit 4002 instructs a field intensity to be set to the wireless tag reader 3. If the reception unit 4001 acquires the instruction for commodity registration, the field intensity instruction unit 4002 outputs an instruction signal to the wireless tag reader 3 to set, for example, the field intensity to the second field intensity. The instruction signal may also set a particular time for emitting radio waves to the wireless tag reader 3.

The tag information acquisition unit 4003 acquires tag information of a wireless tag that is read by the wireless tag reader 3 at the second field intensity. In other words, the tag information acquisition unit 4003 acquires the commodity code and the individual item code read from the item wireless tag attached to the commodity stored in the basket K.

The registration unit 4004 registers the commodity to be purchased by the customer based on the commodity code and the individual item code acquired by the tag information acquisition unit 4003. The commodity registration is executed by the registration unit 4004 which refers to the commodity master data 412 and stores, in the registration information 404, the commodity information or the individual item code corresponding to the commodity code acquired by the tag information acquisition unit 4003.

The registration information output unit 4005 outputs at least the commodity code and the individual item code among the registration information 404 registered by the registration unit 4004 to the commodity management apparatus 5. Alternatively, the registration information output unit 4005 outputs at least the commodity code and the number of the individual item codes corresponding to the commodity code among the registration information 404 registered by the registration unit 4004. That is, the registration information output unit 4005 outputs the commodity code of the registered commodity and information representing the quantity of the commodity corresponding to the commodity code to the commodity management apparatus 5.

Figures 12, 13:
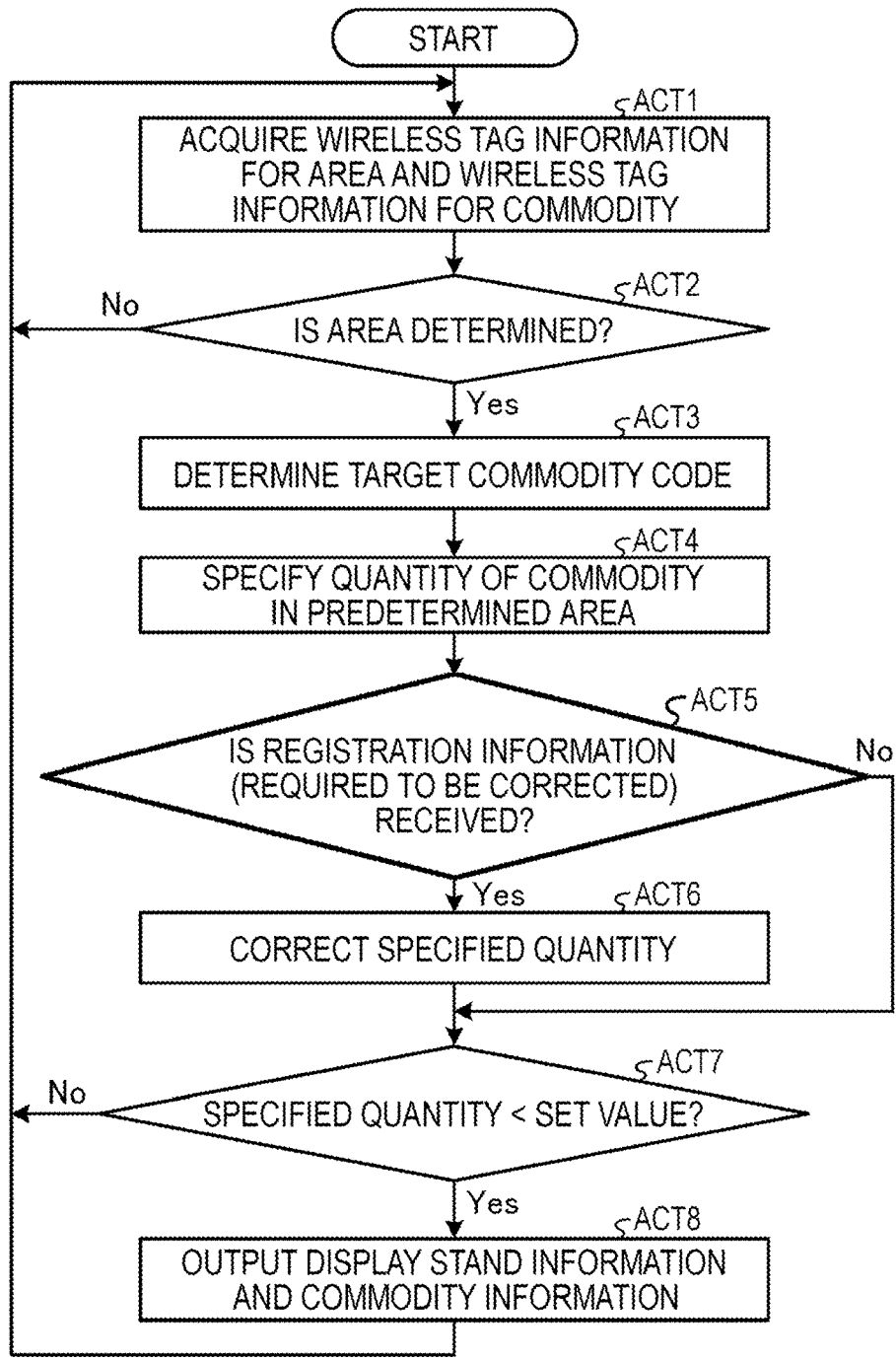
FIG. 12 is a flowchart illustrating processes performed by a commodity management apparatus.
FIG. 13 is a data structure for a wireless tag according to a modification example.

In the commodity management system 1 having the above-described configuration, processes that are executed by the commodity management apparatus 5 will be described with reference to FIG. 12. FIG. 12 is a flowchart of processes executed by the control unit 500 in the commodity management apparatus 5.

The acquisition unit 5001 acquires tag information of an area wireless tag(s) and tag information of an item wireless tag(s) from the wireless tag reader 3 on a regular basis, for example, every 30 seconds (ACT 1). Specifically, the acquisition unit 5001 acquires an area tag ID(s) and an individual item code(s) from the wireless tag reader 3.

Next, the specific target determination unit 5002 determines whether a target area (a display stand in this example) can be determined based on the area tag ID(s) acquired by the acquisition unit 5001 (ACT 2). Specifically, the specific target determination unit 5002 determines whether the area tag ID(s) acquired by the acquisition unit 5001 are specified in the tag ID set field of the commodity area table 512.

If the specific target determination unit 5002 determines the target area (Yes in ACT 2), the specific target determination unit 5002 determines a commodity code of a commodity as a calculation target (ACT 3). Specifically, the specific target determination unit 5002 refers to the commodity area table 512 and determines the commodity code corresponding to the area determined in ACT as the target commodity code. If the specific target determination unit 5002 does not determine the area (No in ACT 2), the control unit 500 returns to the process of ACT 1.

After the process of ACT 3, the first specifying unit 5003 specifies the quantity of the commodity in the determined area using the above-described method (ACT 4). Next, the second specifying unit 5005 determines whether the commodity information reception unit 5004 acquires from the registration apparatus 4 a commodity code of which the quantity of the commodity specified by the first specifying unit 5003 is required to be corrected (ACT 5). If the commodity information reception unit 5004 acquires the corresponding commodity code (Yes in ACT 5), the second specifying unit 5005 corrects the quantity of the commodity specified by the first specifying unit 5003 (ACT 6). Specifically, as described above, if the commodity of which the quantity is specified is stored in the basket K, the second specifying unit 5005 subtracts the quantity of the commodity stored in the basket K from the quantity of the commodity specified by the first specifying unit 5003.

Next, the comparison unit 5006 refers to the set value table 514 and compares the quantity of the commodity specified by the second specifying unit 5005 and a predetermined set value of the corresponding commodity (ACT 7). If the quantity of the commodity specified by the second specifying unit 5005 is less than the set value as a result of the comparison (Yes in ACT 7), the output unit 5007 outputs the display section information and the commodity code to the clerk terminal 6 (ACT 8). The control unit 500 returns to the process of ACT 1.

If the quantity of the commodity specified by the second specifying unit 5005 is not less than the set value (No in ACT 7), the control unit 500 returns to the process of ACT 1. If the commodity information reception unit 5004 does not acquire a commodity code of which the quantity of the commodity specified by the first specifying unit 5003 is required to be corrected in the process of ACT 5 (No in ACT 5), the control unit 500 skips the process of ACT 6 and proceeds to the process of ACT 7.

Through the above-described processes, the commodity management apparatus 5 can notify the clerk of the low stock state where the quantity of the commodity on the display stand is less than the set value. The output destination of the output unit 5007 is not limited to the clerk terminal 6. For example, the output unit 5007 may output the display section information and the commodity code to a display device or a speaker that can make the clerk in the sale counter recognize the output result such that the low stock state can be notified to the clerk using this device.

As described above, the commodity management system 1 can specify the quantity of a commodity displayed on a particular display stand based on individual item codes that have been read from the item wireless tag by the wireless tag reader 3 provided in the cart 2 and area tag IDs that have been read from the area wireless tag. Therefore, the clerk can recognize the low stock state of the commodity in the shop without checking the condition of the commodity on the display stand by himself or herself. In other words, the low stock state of the commodity can be recognized by the clerk without his or her effort using the cart 2 moved by the customer by the store. Accordingly, the loss of sales opportunity in the shop can be suppressed.

In addition, the commodity management system 1 includes the registration apparatus 4 in the cart 2 and specifies the quantity of the commodity displayed on the display stand by subtracting the quantity of the registered commodity, that is, the commodity stored in the basket K. That is, the quantity of the commodity displayed on the display stand can be more accurately recognized.

Further, in the commodity management system 1, the field intensity of the wireless tag reader 3 can be set to the first intensity and the second intensity. The first intensity is an intensity at which tag information of a plurality of area wireless tags beyond the cart 2 and the item wireless tags on commodities positioned within the predetermined area specified by the area wireless tags can be read, and the second intensity is an intensity that is weaker than the first intensity and, in general, tag information from only the item wireless tag(s) on a commodity in the basket K can be read at the second intensity. Therefore, the wireless tag reader 3 can function as a device that reads the tag information for specifying the quantity (stock level) of items on the display stand and also a device that reads commodity codes for commodity registration processing. Accordingly, the configuration of the commodity management system can be simplified.

Furthermore, in the commodity management system 1, if a display stand is in the low stock state, the display stand in the low stock state and a commodity displayed on the display stand are identified to the notification apparatus such as the clerk terminal 6. Therefore, the clerk can become aware that a display stand is in a low stock state and which commodity is displayed on the display stand. Accordingly, the commodities in the shop can be rapidly restocked.

Next, a modification example of the aforementioned embodiments will be described. FIG. 13 is a data structure for an item wireless tag according to the modification example. The item wireless tag stores an individual item code 81, a commodity code 82, a registration flag 83, and other information. The item wireless tag according to the modification example is different from the item wireless tag described above in that the registration flag 83 is stored. In addition, the wireless tag reader 3 is a reader and writer having a writing function to a wireless tag.

If the commodity registration is executed by the registration apparatus 4, the registration flag 83 of the item wireless tag attached to the commodity is rewritten into information representing the completion of the registration by the wireless tag reader 3 having the writing function. In addition, the tag information that has been read from the item wireless tag where the information representing the completion of the registration is stored in the registration flag 83 is ignored.

With this configuration, the commodity management apparatus 5 can recognize commodities that are registered by all the customers and are stored in the baskets K such that the registered commodities can be distinguished from the other commodities displayed on the display stands. Accordingly, the quantity of the commodity displayed on the display stand can be more accurately recognized.

In addition, the control programs used by the wireless tag reader 3, the registration apparatus 4, the commodity management apparatus 5, the clerk terminal 6, and the checkout apparatus 7 may be stored and installed from a computer-readable recording medium such as CD-ROM. In addition, the control programs that are executed by the wireless tag reader 3, the registration apparatus 4, the commodity management apparatus 5, the clerk terminal 6, and the checkout apparatus 7 may be downloaded from a computer connected to a network such as the Internet and installed.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity management system, comprising:
a cart including a wireless tag reader-and-writer, wherein the wireless tag reader-and-writer is configured to read:
first information from first wireless tags attached to commodities displayed in a store, and
second information from second wireless tags associated with different display areas in the store, the second information including tag identifiers (IDs) of the second wireless tags; and
a commodity management apparatus configured to:
acquire the first and second information read by the wireless tag reader-and-writer,
determine a display area in which one of the commodities is displayed, using the tag IDs of the second wireless tags associated with the different display areas, and
specify a first quantity of said one of the commodities displayed in the determined display area based on the acquired first information, wherein
the wireless tag reader-and-writer is configured to emit radio signals at a first intensity and a second intensity less than the first intensity.

2. The commodity management system according to claim 1, further comprising:
a notification apparatus configured to notify a low stock state of commodities, wherein
the commodity management apparatus is further configured to output, if the specified first quantity of said one of the commodities is less than a set value, display section information representing the determined display area and a commodity code of said one of the commodities to the notification apparatus.

3. The commodity management system according to claim 2, wherein the commodity management apparatus includes a memory storing the set value.

4. The commodity management system according to claim 1, wherein the second wireless tags are each disposed on one of a plurality of sides of a corresponding display area.

5. The commodity management system according to claim 4, wherein a path along which the cart is movable faces another one of the sides of the display area that is opposite to said one of the sides of the display area.

6. A commodity management apparatus, comprising:
a network interface configured to communicate with a wireless tag reader-and-writer that is attached to a cart, wherein the wireless tag reader-and-writer is configured to read:
  first information from first wireless tags attached to commodities displayed in a store, and
  second information from second wireless tags associated with different display areas in the store, the second information including tag identifiers (IDs) of the second wireless tags; and
a processor configured to:
  acquire, via the network interface, the first and second information read by the wireless tag reader-and-writer,
  determine a display area in which one of the commodities is displayed, using the tag IDs of the second wireless tags associated with the different display areas, and
  specify a first quantity of said one of the commodities displayed in the determined display area based on the acquired first information, wherein
the wireless tag reader-and-writer is configured to emit radio signals at a first intensity and a second intensity less than the first intensity.

7. The commodity management apparatus according to claim 6, wherein
the network interface is further configured to communicate with a notification apparatus configured to notify a low stock state of commodities, and
the processor is further configured to control the network interface to transmit, if the specified first quantity of said one of the commodities is less than a set value, display section information representing the determined display area and a commodity code of said one of the commodities to the notification apparatus.

8. The commodity management apparatus according to claim 7, further comprising:
a memory storing the set value.

9. The commodity management apparatus according to claim 6, wherein the second wireless tags are each disposed on one of a plurality of sides of a corresponding display area.

10. A commodity management method, comprising:
attaching a wireless tag reader-and-writer to a shopping cart;
emitting radio waves from the wireless tag reader-and-writer to read first information from first wireless tags attached to commodities displayed in a store and second information from second wireless tags associated with different display areas in the store, the second information including tag identifiers (IDs) of the second wireless tags;
transmitting the read first and second information from the wireless tag reader-and-writer to a commodity management apparatus;
determining, by the commodity management apparatus, a display area in which one of the commodities is displayed, using the tag IDs of the second wireless tags associated with the different display areas; and
specifying, by the commodity management apparatus, a quantity of said one of the commodities displayed in the determined display area based on the acquired first information, wherein
the wireless tag reader-and-writer is configured to emit radio signals at a first intensity and a second intensity less than the first intensity.

* * * * *